United States Patent
Kinoshita et al.

(10) Patent No.: US 9,333,992 B2
(45) Date of Patent: May 10, 2016

(54) UPPER SLEWING BODY FOR USE IN CONSTRUCTION MACHINE

(71) Applicant: KOBELCO CONSTRUCTION MACHINERY CO., LTD., Hiroshima-shi (JP)

(72) Inventors: Akira Kinoshita, Hiroshima (JP); Keiji Yamamoto, Hiroshima (JP); Yuji Kawakami, Hiroshima (JP)

(73) Assignee: KOBELCO CONSTRUCTION MACHINERY CO., LTD., Hiroshima-shi (JP)

( * ) Notice: Subject to any disclaimer, the term of this patent is extended or adjusted under 35 U.S.C. 154(b) by 0 days.

(21) Appl. No.: 14/801,195

(22) Filed: Jul. 16, 2015

(65) Prior Publication Data

US 2016/0031494 A1    Feb. 4, 2016

(30) Foreign Application Priority Data

Aug. 1, 2014   (JP) .................................. 2014-157590

(51) Int. Cl.
*E02F 9/16* (2006.01)
*B62D 33/06* (2006.01)
(Continued)

(52) U.S. Cl.
CPC ........ *B62D 33/0604* (2013.01); *B62D 33/0617* (2013.01); *E02F 9/0808* (2013.01); *E02F 9/163* (2013.01); *E02F 9/166* (2013.01); *F16F 15/10* (2013.01)

(58) Field of Classification Search
CPC ............... B62D 21/18; B62D 33/0604; B62D 33/0617; E02F 9/16; E02F 9/163; E02F 9/166
See application file for complete search history.

(56) References Cited

U.S. PATENT DOCUMENTS 3,713,203 A * 1/1973 Fanslow ..................... B60J 5/00
29/281.5
4,043,585 A * 8/1977 Yamanaka ........... B60G 99/002
296/35.1
(Continued)

FOREIGN PATENT DOCUMENTS

CH   WO 2015132292 A1 *  9/2015  ......... B62D 33/0604
JP   2001-193103          7/2001
(Continued)

OTHER PUBLICATIONS

Extended European Search Report issued Dec. 10, 2015 in European Patent Application No. 15177816.4.

*Primary Examiner* — Glenn Dayoan
*Assistant Examiner* — Paul Chenevert
(74) *Attorney, Agent, or Firm* — Oblon, McClelland, Maier & Neustadt, L.L.P.

(57) ABSTRACT

Provided is an upper slewing body comprising: an upper frame, a cab including a bottom frame, a plurality of pillars including an outer pillar, and an entrance; an antivibration mount; a displacement restrainer restraining a cab displacement in a direction of rising away from the upper frame; and a reinforcing member attached to a lower end of the outer pillar for reinforcing a joint between the lower end and the bottom frame. The displacement restrainer includes a penetrating member vertically penetrating the reinforcing member and the bottom frame and secured to the upper frame. The displacement restrainer and the reinforcing member includes respective load transmitting surfaces for transmitting a load to each other above the joint between the bottom frame and the outer pillar when the cab is displaced in the rising direction by a specific amount or more.

7 Claims, 5 Drawing Sheets

(51) Int. Cl.
 *E02F 9/08* (2006.01)
 *F16F 15/10* (2006.01)

(56) References Cited

U.S. PATENT DOCUMENTS

| | | | | | |
|---|---|---|---|---|---|
| 4,095,839 | A | * | 6/1978 | Lawrence | B60R 21/11 135/90 |
| 4,274,671 | A | * | 6/1981 | Slosiarek | B62D 33/0617 180/89.12 |
| 4,515,234 | A | * | 5/1985 | Loy | B62D 33/0604 180/89.12 |
| 4,995,598 | A | * | 2/1991 | Ingham | F16F 1/371 248/635 |
| 5,516,176 | A | * | 5/1996 | Kimoto | B62D 27/04 248/562 |
| 5,520,259 | A | * | 5/1996 | Onohara | B62D 33/0608 180/89.12 |
| 5,529,342 | A | * | 6/1996 | Mast | B60R 21/13 180/89.12 |
| 5,636,867 | A | * | 6/1997 | McNabb | B60R 21/131 180/89.12 |
| 5,984,036 | A | * | 11/1999 | Higuchi | E02F 9/166 180/89.12 |
| 6,340,201 | B1 | * | 1/2002 | Higuchi | B62D 33/0604 180/89.13 |
| 6,810,980 | B2 | * | 11/2004 | Jo | B60R 21/11 180/89.13 |
| 7,287,810 | B2 | * | 10/2007 | Ishii | B62D 33/0604 180/89.14 |
| 7,338,114 | B2 | * | 3/2008 | Ishii | B62D 33/07 180/89.15 |
| 7,410,207 | B2 | * | 8/2008 | Fornell | B62D 33/077 296/190.03 |
| 7,722,008 | B2 | * | 5/2010 | Yoon | E02F 9/163 180/89.12 |
| 8,177,290 | B2 | * | 5/2012 | Kamimae | B62D 33/0617 296/190.08 |
| 8,240,745 | B2 | * | 8/2012 | Yamamoto | B62D 33/0604 296/187.13 |
| 8,517,457 | B2 | * | 8/2013 | Yamamoto | B62D 33/0604 296/190.07 |
| 8,657,251 | B2 | * | 2/2014 | Kamimae | E02F 9/166 180/89.12 |
| 8,911,003 | B2 | * | 12/2014 | Selent | F16F 15/02 180/89.12 |
| 9,016,657 | B2 | * | 4/2015 | Fang | E02F 9/163 248/638 |
| 9,061,644 | B2 | * | 6/2015 | Scott | B60R 21/13 |
| 2006/0071499 | A1 | * | 4/2006 | Yoon | B62D 33/0604 296/35.1 |
| 2006/0261640 | A1 | * | 11/2006 | Mori | B62D 33/0604 296/190.07 |
| 2009/0140547 | A1 | | 6/2009 | Murakami | |
| 2009/0256393 | A1 | | 10/2009 | Kim | |
| 2011/0135434 | A1 | * | 6/2011 | Yoon | B62D 33/0604 414/694 |
| 2012/0187721 | A1 | * | 7/2012 | Nishimura | E02F 9/16 296/190.03 |

FOREIGN PATENT DOCUMENTS

| | | | | |
|---|---|---|---|---|
| JP | 2005-344394 | | 12/2005 | |
| JP | 2005344394 A | * | 12/2005 | E02F 9/16 |
| JP | 3966395 B2 | * | 8/2007 | E02F 3/325 |
| JP | WO 2009020002 A1 | * | 2/2009 | B62D 25/08 |
| JP | 2009-133119 | | 6/2009 | |
| JP | 2010-013095 | | 1/2010 | |
| JP | 2010-042761 A | | 2/2010 | |
| JP | 2010-048026 A | | 3/2010 | |
| JP | 2010-095999 | | 4/2010 | |
| JP | 2010095999 A | * | 4/2010 | E02F 9/16 |
| JP | 2010-270557 A | | 12/2010 | |
| JP | 2012-082595 A | | 4/2012 | |

* cited by examiner

FIG. 7
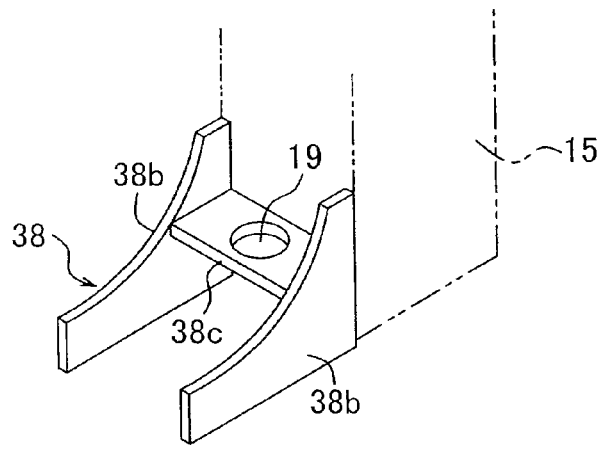
FIG. 8A  FIG. 8B  FIG. 8C
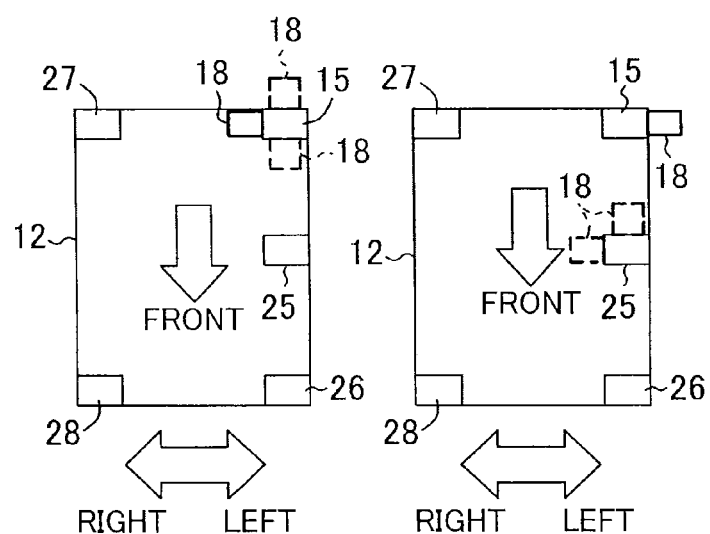
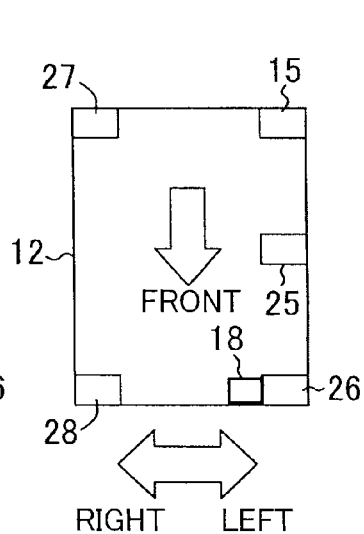

UPPER SLEWING BODY FOR USE IN CONSTRUCTION MACHINE

This application is based on Japanese Patent application No. 2014-157590 filed in Japan Patent Office on Aug. 1, 2014, the contents of which are hereby incorporated by reference.

TECHNICAL FIELD

The present invention relates to an upper slewing body for use in a construction machine such as an excavator, the upper stewing body including a cab in which an operator rides and an upper frame supporting the cab.

BACKGROUND ART

The background art of the present invention will be described by taking an excavator as an example.

An ordinary excavator includes a crawler type lower travelling body, an upper slewing body mounted on the lower travelling body so as to be slewable, and a working attachment attached to the upper slewing body, the working attachment including a boom. The upper slewing body includes a cab in which an operator rides and an upper frame supporting the cab, the cab including a bottom frame forming the bottom of the cab and a plurality of pillars joined to the bottom frame.

As the above-mentioned upper slewing body, there is known an upper slewing body including an antivibration mount disposed between the cab and the upper frame. The antivibration mount is, as disclosed in Japanese Unexamined Patent Publication No. 2001-193103 and Japanese Unexamined Patent Publication No. 2009-133119, made of an elastic material such as vibration isolation rubber, and elastically deformed to permit the cab to make a relative displacement with respect to the upper frame vertically and horizontally to thereby suppress transmission of a vibration from the upper frame to the cab.

However, when the relative displacement of the cab with respect to the upper frame exceeds a permissible deformation amount of the antivibration mount due to turning over of the construction machine or the like, the elastic material constituting the antivibration mount is liable to reach its elastic limit and break. Therefore, it is desired to restrain the cab from a relative displacement with respect to the upper frame to protect the antivibration mount.

Japanese Unexamined Patent Publication No. 2001-193103 discloses a means to restrain a displacement of the cab, the means including a bolt passing through the upper frame and the cab, and a nut attached to an upper end of the bolt, the nut being operable to come into contact with an upper surface of a bottom frame of the cab to thereby restrain the displacement of the cab.

Japanese Unexamined Patent Publication No. 2009-133119 discloses a construction machine including a plate with a hole disposed on an upper frame and projecting upward, and a shaft horizontally projecting from a cab to pass through the hole of the plate with a clearance corresponding to a permissible deformation amount of an antivibration mount. The shaft comes into contact with the plate when an upward displacement, i.e., rising, of the cab with respect to the upper frame reaches the permissible deformation amount, thereby preventing the cab from excessive rising.

Either of respective technologies disclosed in Japanese Unexamined Patent Publication Nos. 2001-193103 and 2009-133119 however, is ineffective against a lateral load acting on an outer pillar of the cab, i.e., a load acting on the upper slewing body in a left-right direction or in a forward-backward direction. There can be a large lateral load acting on a joint between the bottom frame of the cab and a lower end of an outer pillar upon overturning of the construction machine or the like. The lateral load may break the joint to thereby cause the outer pillar to fall down, thus making the cab be likely to be deformed.

SUMMARY OF INVENTION

The object of the present invention is to provide an upper slewing body for use in a construction machine, the upper slewing body including an upper frame and a cab, and being capable of restraining the cab from excessively rising away from the upper frame and preventing an outer pillar included in the cab from falling down. Provided is an upper slewing body for use in a construction machine, configured to be mounted on a lower travelling body of the construction machine so as to be slewable, the upper slewing body comprising: an upper frame including a left side portion and a right side portion; a cab mounted on one of the left side portion and the right side portion, the cab including a bottom frame constituting a bottom wall of the cab, a plurality of pillars each having a lower end joined to an upper surface of the bottom frame to thereby allow the pillar to stand on a periphery of the cab, and an entrance opening on an outer side of the upper frame, the plurality of pillars including an outer pillar located on a side where the entrance opening exists; an antivibration mount for suppressing a vibration of the cab; a displacement restrainer for limiting a displacement of the cab relative to the upper frame in a direction of rising away from the upper frame to a specific amount or less; and a reinforcing member attached to the lower end of the outer pillar to reinforce a joint between the lower end and the bottom frame. The displacement restrainer includes a penetrating member vertically penetrating the reinforcing member and the bottom frame and being secured to the upper frame. The displacement restrainer and the reinforcing member include respective load transmitting surfaces which are vertically opposed to each other so as to transmit a load to each other at a position above the joint between the bottom frame and the outer pillar when the cab is displaced in the rising direction by the specific amount or more.

These and other objects, features and advantages of the present invention will become more apparent upon reading the following detailed description along with the accompanying drawings.

BRIEF DESCRIPTION OF DRAWINGS

FIG. 7 is a perspective view of a modified reinforcing member.

FIGS. 8A, 8B, and 8C are respective plan views showing modified dispositions of the reinforcing member.

DESCRIPTION OF EMBODIMENTS

An embodiment of the present invention will be described with reference to the accompanying drawings.

Prior to describing the embodiment of the present invention, will be described an upper slewing body according to a comparative example (prior art) shown in FIGS. 9 and 10 in order to clarify the feature of the embodiment of the present invention.

Figure 9:
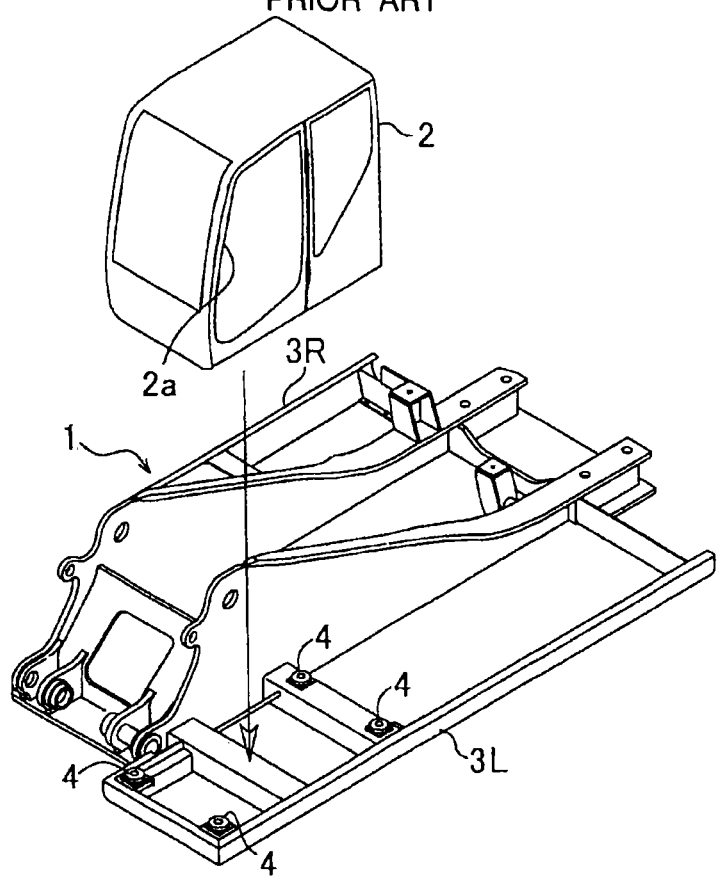
FIG. 9 is a perspective view of an upper frame and a cab of an upper slewing body according to a comparative example to the embodiment of the present invention (prior art).

The upper slewing body shown in FIG. 9 includes an upper frame 1, a cab 2, and a plurality of antivibration mounts 4. The upper frame 1 includes a left side deck 3L forming a left side portion thereof and a right side deck 3R forming a right side portion thereof. The cab 2 is mounted on one of the left side portion and the right side portion. Hereinafter, "forward-backward direction" and "left-right direction" of the upper stewing body according to the comparative example and an upper slewing body according to the later described embodiment will be specified based on the assumption that the cab is mounted on the left side portion of the upper frame as shown in FIG. 9 (on the left side deck in FIG. 9).

The cab 2 is mounted on a front portion of the left side deck 3L. The cab 2 includes an entrance 2a opening on a laterally outer side thereof.

The plurality of antivibration mounts 4 are disposed between four corners of the bottom of the cab 2 and the corresponding portions of the upper frame 1 located thereunder, respectively, thus supporting the cab 2. Each of the antivibration mounts 4 is made of an elastic material such as vibration isolation rubber, being elastically deformable to permit the cab 2 to make a displacement with respect to the upper frame 1 vertically and horizontally to thereby suppress transmission of a vibration from the upper frame 1 to the cab 2.

The antivibration mounts 4 exert a resistance force against a load acting on the cab 2 in a direction of raising the cab 2 away from the left side deck 3L of the upper frame 1, the resistance force being exerted by extension of the elastic materials constituting the antivibration mounts 4 in the rising direction. However, if a displacement of the cab 2 is so great as to exceed a normal stroke of the antivibration mounts 4 upon overturning of the machine, the elastic materials of the antivibration mounts 4 are liable to reach its elastic limit to be broken; hence, in order to protect the antivibration mounts 4, there is provided a displacement restrainer for restraining a displacement of the cab 2.

Figure 10:
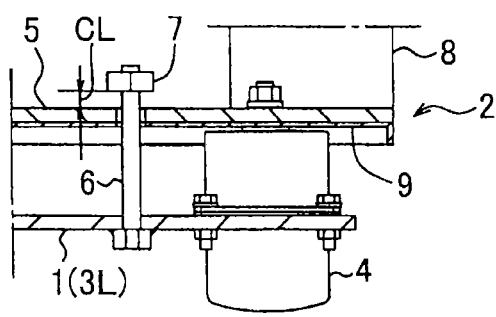
FIG. 10 is a sectional view showing a structure for supporting the cab according to the comparative example (prior art).

The displacement restrainer includes a bolt 6 and a nut 7 shown in FIG. 10. The bolt 6 penetrates the left side deck 3L of the upper frame 1 and a bottom frame 5 defining a periphery of the bottom of the cab 2, the nut 7 being attached to an upper end of the bolt 6. The nut 7 comes into contact with an upper surface of the bottom frame 5 when the cab 2 is displaced in the rising direction by a specific amount or more, thereby restraining the cab 2 from further displacement. The bottom of the cab is constituted by the bottom frame 5 and a floor plate 9 shown in FIG. 10. There is given a clearance CL between a lower surface of the nut 7 and the upper surface of the bottom frame 5, the clearance CL corresponding to a permissible elastic deformation amount of the antivibration mounts 4.

The cab 2 further includes a plurality of pillars 8 constituting a cab frame which is a main structure of the cab, one of the pillars 8 being shown in FIG. 10. Each of the pillars 8 is in the form of a hollow rectangular column. The plurality of pillars 8 are provided, for example, at front and rear portions on the right side, and front, middle, and rear portions on the left side including the entrance 2a, respectively. Each of the pillars 8 has a lower end and is kept standing by joining the lower end to the upper surface of the bottom frame 5, for example, by welding. Upon overturning of the machine, a pillar on the entrance side, i.e., on the outer side, included in the plurality of pillars 8 receives a lateral load, that is, a load in the left-right direction or in the forward-backward direction.

However, the structure according to the comparative example cannot exert a resistance force against a lateral load acting on the outer pillar 8 (that is, a load in the left-right direction or in the forward-backward direction), even though being capable of suppressing a displacement of the cab 2 with respect to the upper frame 1 in the rising direction. Therefore, there is a possibility of a large load which acts on the lower end joint where the lower end of the outer pillar 8 is joined with the bottom frame 5, upon overturning of the machine, which may break the lower end joint. The break in the lower end joint will permit the outer pillar 8 to fall down, thus making the cab 2 be likely to be deformed.

FIGS. 1 to 8 show a structure of the upper slewing body according to the embodiment of the present invention, the structure being able to overcome the above-described problems of the upper slewing body according to the comparative example.

The upper slewing body according to the present embodiment constitutes a part of an excavator which is a construction machine including a crawler-type lower travelling body and a working attachment such as a boom, mounted on the lower travelling body so as to be slewable. The working attachment is attached to the upper slewing body.

Figure 1:
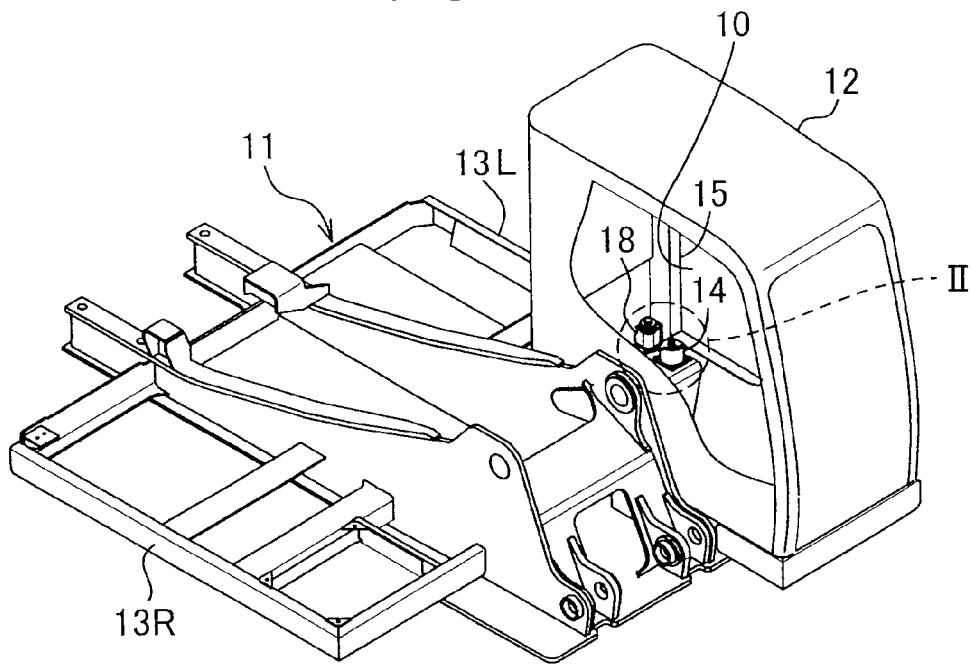
FIG. 1 is a perspective view of an upper frame and a cab of an upper slewing body according to an embodiment of the present invention.
Figure 2:
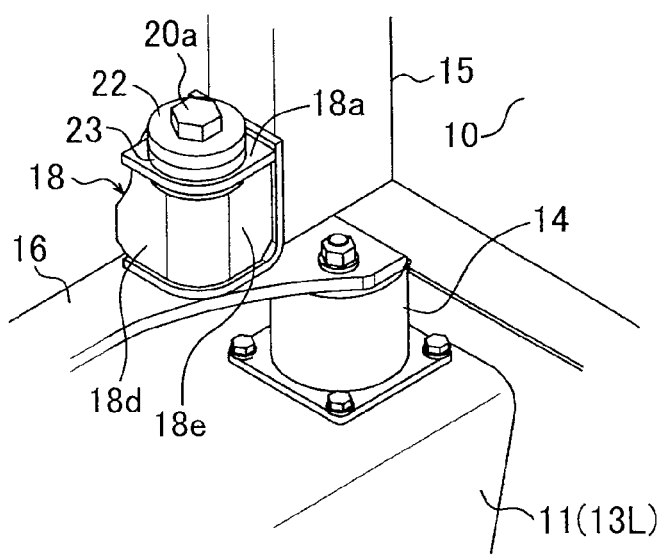
FIG. 2 is an enlarged view of a portion enclosed by the circle II in FIG. 1.

The upper slewing body includes an upper frame 11 and a cab 12 shown in FIG. 1. The upper frame 11 includes a left side deck 13L which is a left side portion thereof and a right side deck 13R which is a right side portion thereof, the cab 12 mounted on a front portion of the left side deck 13L. The cab 12 includes an entrance 10 opening on an outer side thereof.

The upper slewing body further includes a plurality of antivibration mounts 14. The plurality of antivibration mounts 14 are disposed between four corners of the bottom of the cab 12 and the corresponding portions of the upper frame 11 located thereunder, respectively. In summary, the cab 12 is mounted on the upper frame 11 via the plurality of antivibration mounts 14. Each of the antivibration mounts 14 is made of an elastic material such as vibration isolation rubber. The antivibration mounts 14 support the cab 12 while permitting the cab 12 to be vertically and horizontally displaced within a specific range by elastic deformation of the elastic materials, thereby suppressing transmission of a vibration from the upper frame 11 to the cab 12.

The antivibration mounts 14 exert a resistance force against a load on the cab 12 in a direction of raising the cab 4 away from the left side deck 13L of the upper frame 11, the resistance force being exerted by extension of the elastic materials constituting the antivibration mounts 14 in the rising direction. However, if the displacement of the cab 12 is so great that deformation of the antivibration mounts 14 exceeds a permissible deformation amount upon overturning of the machine, there is caused a possibility that the elastic materials of the antivibration mounts 14 reach its elastic limit to be broken. In view of this, the upper slewing body further includes a displacement restrainer described below, the displacement restrainer restraining the displacement of the cab 12 to protect the antivibration mounts 14.

The cab 12 includes a bottom frame 16 defining a periphery of the bottom thereof, a plurality of pillars constituting a cab frame which is a main structure of the cab 12, and a floor plate 17 constituting the bottom of the cab 12 in cooperation with the bottom frame 16.

The plurality of pillars are provided, for example, at front and rear portions on the right side, and front, middle, and rear portions on the left side where the entrance 10 exists, respectively. FIGS. 1 to 6 show a pillar 15 disposed at the left rear portion on a side where the entrance 10 exists, the pillar 15 being one of the plurality of pillars and exemplifying "an outer pillar" of the present invention. The upper slewing body according to the present embodiment includes a structure for restraining the pillar 15 from falling down.

The pillar 15 has a lower end, which is joined to an upper surface of the bottom frame 16, for example, by welding, to thereby keep the pillar 15 standing. The pillar 15, thus, receives a lateral load, i.e., a load in the left-right direction or in the forward-backward direction, upon overturning of the machine.

The upper slewing body further includes a reinforcing member 18 secured to a right surface of the lower end of the pillar 15. The reinforcing member 18 is in the form of a box including a top wall 18a, a bottom wall 18b, a left wall 18c, a right wall 18d, a front wall 18e, and an unillustrated rear wall, these walls defining an internal space. The left wall 18c of the reinforcing member 18 is secured to the pillar 15 while making surface contact with the right surface of the pillar 15. Similarly, the bottom wall 18b of the reinforcing member 18 is secured to the bottom frame 16 while making surface contact with the upper surface of the bottom frame 16. For the securing, adopted is a joining method such as welding, bolt fastening or the like.

Figure 3:
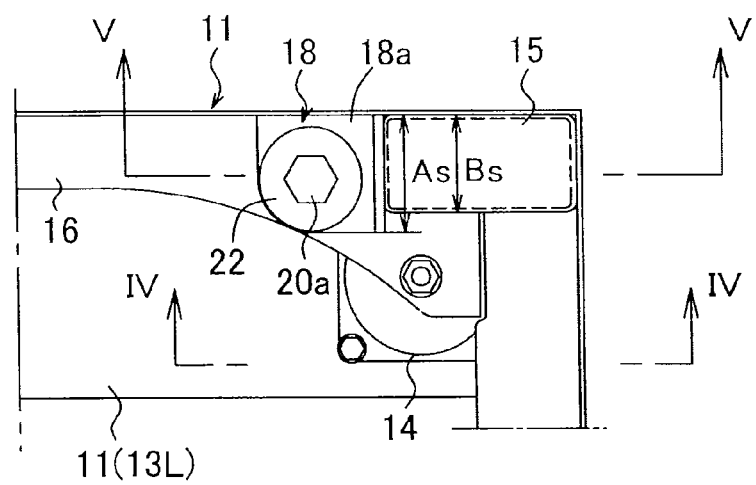
FIG. 3 is a plan view of the portion shown in FIG. 2.
Figure 4:
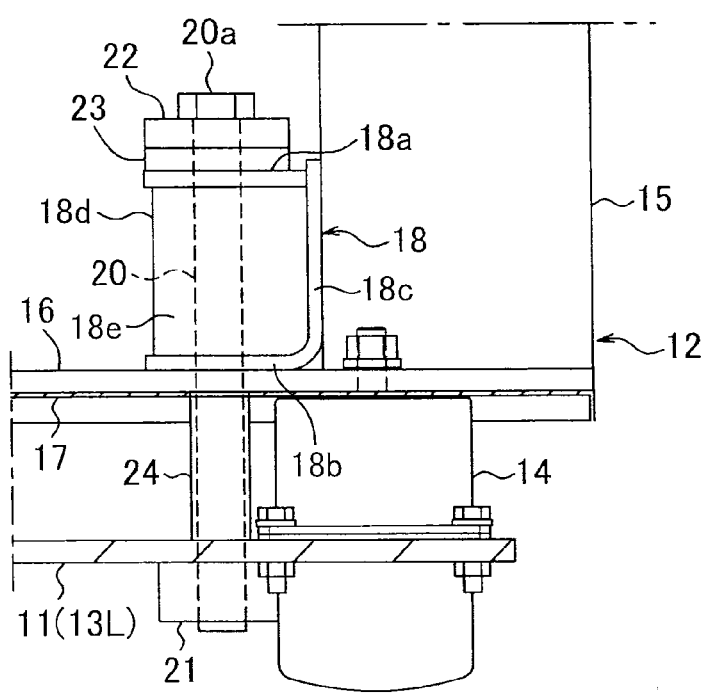
FIG. 4 is an enlarged cross-sectional view taken along the line IV-IV in FIG. 3.
Figure 5:
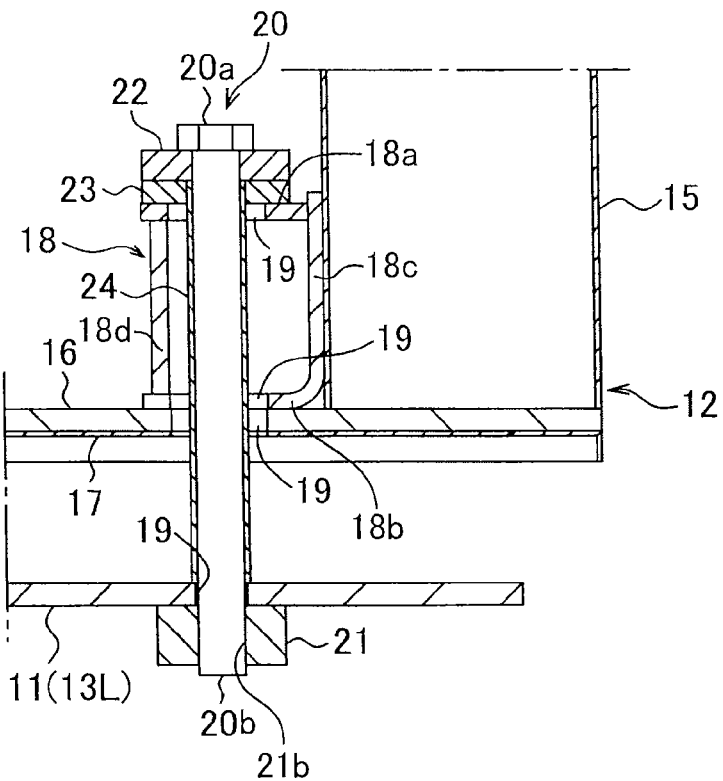
FIG. 5 is an enlarged cross-sectional view taken along the line V-V in FIG. 3.
Figure 6:
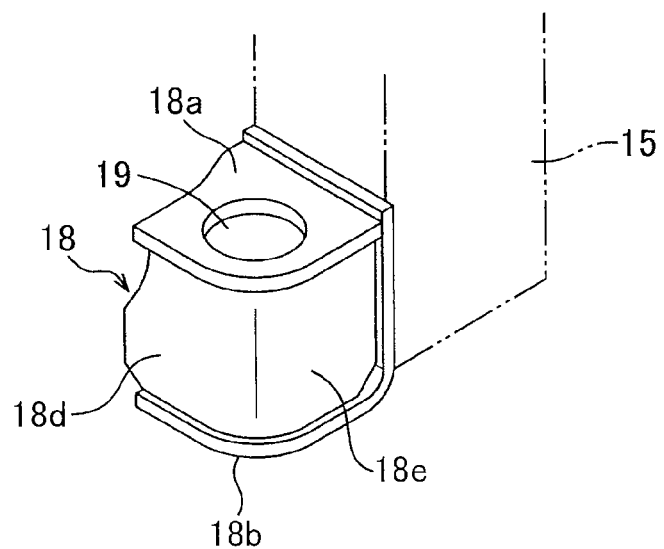
FIG. 6 is a perspective view of a reinforcing member included in the upper slewing body.

As shown in FIG. 3, the left surface of the reinforcing member 18 has a dimension As with respect to the forward-backward direction, the dimension As being greater than a dimension Bs of the right surface of the pillar 15 in the forward-backward direction, in plan view. The reinforcing member 18, thus, has a front end which protrudes beyond a front surface of the pillar 15.

In this upper slewing body, there are provided a plurality of bolt passage holes 19 vertically passing through the bottom wall 18b and the top wall 18a of the reinforcing member 18, the bottom frame 16, the floor plate 17, and the left side deck 13L of the upper frame 11, respectively, a restraining bolt 20 being inserted into the plurality of bolt passage holes 19 from above as a penetrating member. The restraining bolt 20 thus penetrates the reinforcing member 18 and the bottom frame 16 vertically.

The restraining bolt 20 has opposite ends, namely, a head 20a and a lower end 20b, and at least the lower end 20b is formed with a male thread. On the other hand, to the left side deck 13L of the upper frame 11 is secured a tapped block 21 having a screw hole 21b as a female thread member. The lower end 20b is screwed into the screw hole 21b, thereby secured to the upper frame 11 via the tapped block 21.

The upper slewing body further includes a washer 22, and a sealing member 23 made of an elastic material. The washer 22 and the sealing member 23 are loosely fit around the restraining bolt 20 in such a manner that the washer 22 is placed above the sealing member 23 between the head 20a and the top wall 18a of the reinforcing member 18. The sealing member 23 seals an annular space of the bolt passage hole 19 formed in the top wall 18a of the reinforcing member 18 by the elastic deformation of the sealing member 23 itself, in the case of such displacement of the cab 12 with respect to the upper frame 11 that deformation of the antivibration mounts 14 is equal to or less than the permissible deformation amount. On the other hand, the sealing member 23 is allowed to reach its elastic limit by such displacement that deformation of the antivibration mounts 14 exceeds the permissible deformation amount, thereby making an action of transmitting a load between the washer 22 and the reinforcing member 18.

Thus, the displacement restrainer of the upper slewing body includes the restraining bolt 20 as the penetrating member and the washer 22, while the sealing member 23 is interposed between a lower surface of the washer 22 and the top wall 18a of the reinforcing member 18, allowing the lower surface of the washer 22 and an upper surface of the top wall 18a of the reinforcing member 18 to come into contact with the sealing member 23 to sandwich the sealing member 23 therebetween to thereby limit a displacement of the cab 12 in the rising direction to a specific amount or less when the cab 12 is displaced relatively to the upper frame 11 in the rising direction by the specific amount or more.

The present embodiment further includes a cylindrical spacer 24. The spacer 24 is disposed between an upper surface of the upper frame 11 and the lower surface of the washer 22, while loosely fitted around the restraining bolt 20, to thereby define a minimum gap between the upper surface of the upper frame 11 and the lower surface of the washer 22, i.e., a maximum compression amount of the sealing member 23.

In the above-described upper slewing body, the reinforcing member 18 receives a lateral load which acts on the pillar 15, in particular in the left-right direction, as a result of overturning of the machine including the upper slewing body, and transmits the load to the upper frame 11 via the displacement restrainer. In this manner, the following advantageous effects can be obtained.

(I) The reinforcing member 18 can strengthen the lower end joint of the pillar 15 by being attached to the lower end, i.e., the basal portion, of the pillar 15. Specifically, the reinforcing member 18 can disperse a lateral load acting on the pillar 15 to thereby reduce a load acting on the lower end joint of the pillar 15. Furthermore, the reinforcing member 18, engaged with the restraining bolt 20 at a position above the lower end joint of the pillar 15, can transmit the lateral load acting thereon upon overturning of the machine to the restraining bolt 20 secured to the upper frame 11, at a position above the lower end joint of the pillar 15. This allows the load acting on the lower end joint to be further reduced. The pillar 15 is, thus, effectively prevented from falling down upon overturning of the machine.

(II) The reinforcing member 18 includes the top wall 18a which is a horizontal one formed with the bolt passage hole 19 allowing the restraining bolt 20 to pass therethrough, while the washer 22 is placed around the restraining bolt 20 and each of the upper surface of the top wall 18a and the lower surface of the washer 22 serves as the load transmitting surface opposed to each other (specifically, each comes into contact with the same sealing member 23) so as to transmit a load to each other; this allows the reinforcing member 18 to function as load transmission means in cooperation with the displacement restrainer and, therefore, allows the cab to have a simplified structure, for example, as compared to the case of adding reinforcement to a structural element of the cab such as the bottom frame itself to make it constitute a part of the displacement restrainer.

(III) The sealing member 23 is disposed between the upper surface of the top wall 18a serving as the load transmitting surface of the reinforcing member 18 and the lower surface of the washer 22 serving as the load transmitting surface of the displacement restrainer to come into contact with the load transmitting surfaces, having the following functions: a function of sealing the space defined around the restraining bolt 20 passing through the passage holes 19 in a normal state where a relative displacement of the cab 12 with respect to the upper frame 11 is so small that deformation of the antivibration mounts 14 is equal to or less than the permissible deformation amount; and a function of transmitting a load between the load transmitting surfaces in an abnormal state where the above relative displacement is so great that deformation of the antivibration mounts 14 exceeds the permissible deformation amount. Thus, the sealing member 23 can ensure air tightness in the cab 12 by preventing flow of air between the inside and the outside of the cab 12 through the space around the bolt 20 passing through the passage holes 19 in the normal state, and can reliably performs the function of transmitting a load between the load transmitting surfaces in the abnormal state.

(IV) The reinforcing member 18 is in the form of a box including the top wall 18a, the bottom wall 18b, the left wall 18c, the right wall 18d, the front wall 18e, and the rear wall, all of which walls define an internal space, the upper surface of the top wall 18a serving as the load transmitting surface and the outer surface of the left wall 18c which is one of the outer surfaces of the reinforcing member 18 coming into surface contact with the right surface of the pillar 15. This simultaneously makes it possible: (1) to allow the reinforcing member 18 itself to have a box structure with high strength; and (2) to allow the reinforcing member 18 and the pillar 15 to make in contact with each other over a large area, thereby enhancing either of the reinforcing effect and the load distributing effect provided by the pillar 15.

(V) The dimension As of the left surface of the reinforcing member 18 making surface contact with the pillar 15 in the forward-backward direction is greater than the dimension Bs of the right surface of the pillar 15 in the forward-backward direction in plan view; this allows the pillar 15 and the reinforcing member 18 to make contact with each other over a large area, thus enhancing the load distributing effect, and, in the case of joining the reinforcing member 18 to the pillar 15 by welding, further makes it possible to set the area of welding to be large to thereby enhance the joint strength therebetween.

(VI) The pillar 15 attached with the reinforcing member 18, being one of the plurality of outer pillars and being disposed at the rear portion of the cab, is originally provided with high rigidity which makes the pillar 15 hard to deform upon overturning, and therefore has a structure not likely to release a load and allowing the lower end joint thereof to be easily broken. Accordingly, the attachment of the reinforcing member 18 to the pillar 15 is very effective for preventing the pillar 15 from falling down.

(VII) The reinforcing member 18, disposed with utilization of an existing dead space in the cab 12, requires neither creating an additional space outside the cab 12 nor changing the arrangement of structural elements disposed outside the cab 12 to create the space, different from the case of disposing the reinforcing member 18 outside the cab 12. This facilitates layout of the elements around the cab 12.

The present invention is, however, not limited to the above-described embodiment, including, for example, the following embodiments.

(1) While the sealing member 23 according to the above-described embodiment is disposed between the lower surface of the washer 22 and the upper surface of top wall 18a of the reinforcing member 18 to have a function of transmitting a load between those surfaces in the abnormal state, the present invention also includes an embodiment including a different sealing member having only a sealing function, for example, a sealing member disposed in contact with one or some of the lower surface of the top wall 18a, and the upper and lower surfaces of the bottom wall 18b of the reinforcing member 18. Furthermore, the sealing member is allowed to be omitted as appropriate.

(2) The reinforcing member according to the present invention is not limited to one formed in a box shape such as the reinforcing member 18. The shape of the reinforcing member can be variously modified as long as the reinforcing member can receive a lateral load upon overturning of the machine and constitute a displacement restrainer. FIG. 7 shows a reinforcing member 38 as a modification. The reinforcing member 38 includes a pair of front and rear plates 38b, 38b, and a horizontal wall 38c disposed between the pair of plates 38b, 38b, having an H-shape in a side view. Each of the plates 38b has a substantially right triangle shape with a horizontal base side and a vertical side joinable to the side surface of the pillar 15. In the reinforcing member 38, the horizontal wall 38c is formed with a bolt passage hole 19.

(3) The configuration of the present invention may be appropriately modified to dispose the reinforcing member at a different position. FIGS. 8A, 8B, and 8C illustrate respective examples in each of which the reinforcing member 18 is disposed at a different position. FIGS. 8A to 8C show, in addition to the pillar 15 (disposed at the left rear portion), a pillar 25 disposed at the left middle portion, a pillar 26 disposed at a left front portion, a pillar 27 disposed at a right rear portion, and a pillar 28 disposed at a right front portion, respectively, and each of the pillars 15, 25 and 26 out of the above pillars corresponds to the outer pillar. Further, the positions illustrated below are applicable not only to the reinforcing member 18 but also to, for example, the reinforcing member 38. In other words, the specific structure of the reinforcing member does not matter.

The reinforcing member 18 may be disposed at, other than the position according to the above-described embodiment, i.e., on the right side of the pillar 15 (which is disposed at the left rear portion) shown by the solid line in FIG. 8A, positions shown by the dashed line in FIG. 8A, i.e., on the front side of the pillar 15 or on the rear side of the pillar 15 at the outside of the cab 12. Alternatively, the reinforcing member 18 may be disposed on the left side or on the rear side of the pillar 25 disposed at the left middle portion as shown by the dashed line in FIG. 8B. Alternatively, the reinforcing member 18 may be disposed on the right side of the pillar 26 disposed at the left front portion as shown in FIG. 8C. The reinforcing member 18 is highly effectively protected against a horizontal load, in particular, components of the horizontal load acting in the forward-backward direction, when disposed on the rear side or the front side of the outer pillar.

Alternatively, the present invention can include a plurality of reinforcing members attached to respective surfaces of a common pillar, or can include a plurality of reinforcing members attached to respective pillars disposed outside.

As described above, provided is an upper slewing body for use in a construction machine, the upper slewing body including an upper frame and a cab, and being capable of restraining the cab from excessively rising away from the upper frame and preventing an outer pillar included in the cab from falling down. The upper slewing body is configured to be mounted on a lower travelling body of the construction machine so as to be slewable, comprising: an upper frame including a left side portion and a right side portion; a cab mounted on one of the left side portion and the right side portion, the cab including a bottom frame constituting a bottom wall of the cab, a plurality of pillars each having a lower end joined to an upper surface of the bottom frame to thereby allow the pillar to stand on a periphery of the cab, and an entrance opening on an outer side of the upper frame, the plurality of pillars including an outer pillar located on a side where the entrance opening exists; an antivibration mount for suppressing a vibration of the cab; a displacement restrainer for limiting a relative displacement of the cab with respect to the upper frame in a direction of rising away from the upper frame to a specific amount or less; and a reinforcing member attached to the lower end of the outer pillar to reinforce a joint between the lower end and the bottom frame. The displacement restrainer includes a penetrating member vertically penetrating the reinforcing member and the bottom frame and being secured to the upper frame. The displacement restrainer and the reinforcing member include respective load transmitting surfaces which are vertically opposed to each other so as to transmit a load to each other at a position above the joint between the bottom frame and the outer pillar when the cab is displaced in the rising direction by the specific amount or more.

The reinforcing member of the upper slewing body, attached to the lower end, i.e., the basal portion, of the outer pillar, can strengthen the lower end joint. Specifically, the reinforcing member can disperse a lateral load acting on the outer pillar, thereby reducing a load acting on the lower end joint of the outer pillar. Furthermore, the reinforcing member, engaged with the penetrating member constituting the displacement restrainer at a position above the lower end joint of the outer pillar, can transmit the lateral load acting on the cab upon overturning of the machine to the penetrating member and further to the upper frame, at a position above the lower end joint of the outer pillar, thereby reducing a load acting on the lower end joint. Thus, the pillar is effectively prevented from falling down upon overturning of the machine.

It is preferred that: the reinforcing member includes a horizontal wall formed with a penetrating-member passage hole allowing the penetrating member to penetrate therethrough; the displacement restrainer includes a washer placed around the penetrating member; the horizontal wall has an upper surface serving as the load transmitting surface of the reinforcing member; and the washer has a lower surface serving as the load transmitting surface of the displacement restrainer. This allows the reinforcing member to function as load transmission means in cooperation with the displacement restrainer, thus allowing the cab to have a simplified structure, for example, as compared to the case of adding reinforcement to a structural element of the cab such as the bottom frame itself to make the element constitute a part of the displacement restrainer.

It is preferred that the upper slewing body further comprises a sealing member made of an elastic material and disposed between the respective load transmitting surfaces of the reinforcing member and the displacement restrainer, the sealing member configured to seal a space defined around the penetrating member penetrating the reinforcing member and the bottom frame when deformation of the antivibration mount is equal to or less than a permissible deformation amount and configured to transmit a load between the load transmitting surfaces when deformation of the antivibration mount exceeds the permissible deformation amount.

The sealing member can maintain air tightness in the cab by preventing flow of air between the inside and the outside of the cab through the space around the penetrating member passing through the reinforcing member and the bottom frame, and further, when deformation of the antivibration mount exceeds the permissible deformation amount, can function as a member transmitting a load between the load transmitting surfaces.

Besides, it is preferred that the reinforcing member is in the form of a box including a front wall, a rear wall, a left wall, a right wall, a top wall and a bottom wall to define an internal space, the top wall having an upper surface serving as the load transmitting surface of the reinforcing member, and that the reinforcing member is attached to the outer pillar with an outer surface of one of the front wall, the rear wall, the left wall and the right wall, while making surface contact with a side surface of the outer pillar. This makes it possible: (1) to allow the reinforcing member itself to have a box structure with high strength and (2) to allow the reinforcing member and the outer pillar to make contact with each other over a large area, thereby enhancing the reinforcing effect and the load distributing effect provided by the outer pillar.

In this case, it is preferred that the outer surface of the reinforcing member making surface contact with the outer pillar has a greater dimension in plan view, than a dimension in plan view of the side surface of the outer pillar making surface contact with the outer surface. This allows the outer pillar and the reinforcing member to make contact with each other over a large area, thus enabling the load dispersion effect to be enhanced, and further, in the case of joining the reinforcing member to the outer pillar by welding, allows the area of welding to be enlarged to thereby enhance the joint strength therebetween.

It is preferred that the outer pillar attached with the reinforcing member is disposed at a rear portion of the cab. The thus disposed pillar is close to an operator's seat, and is therefore given high rigidity so as not to be likely to deform upon overturning in the perspective of protecting an occupant, thus being not likely to release a load and therefore allowing the lower end joint to be easily broken. Accordingly, the attachment of the reinforcing member to the pillar is especially effective for prevention of the pillar from falling down.

It is preferred that the reinforcing member is attached to the outer pillar while disposed inside the cab. This makes it possible to utilize an existing dead space in the cab to be utilized, thus eliminating need for creating an additional space outside the cab or for changing the arrangement of structural elements disposed outside the cab to create the space, different from the case of disposing the reinforcing member outside the cab. This facilitates layout of the elements around the cab.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

The invention claimed is:

1. An upper slewing body for use in a construction machine, the upper slewing body configured to be mounted on a lower travelling body of the construction machine so as to be slewable and comprising:
   an upper frame including a left side portion and a right side portion;
   a cab mounted on one of the left side portion and the right side portion, the cab including a bottom frame constituting a bottom wall of the cab, a plurality of pillars each having a lower end joined to an upper surface of the bottom frame to thereby allow the pillar to stand on a periphery of the cab, and an entrance opening on an outer side of the upper frame, the plurality of pillars including an outer pillar located on a side where the entrance opening exists;

an antivibration mount for suppressing a vibration of the cab;

a displacement restrainer for limiting a relative displacement of the cab with respect to the upper frame in a direction of rising away from the upper frame to a specific amount or less; and a reinforcing member attached to the lower end of the outer pillar to reinforce the joint between the lower end and the bottom frame, wherein the displacement restrainer includes a penetrating member vertically penetrating the reinforcing member and the bottom frame and being secured to the upper frame, and the displacement restrainer and the reinforcing member includes respective load transmitting surfaces vertically opposed to each other so as to transmit a load to each other at a position above the joint between the bottom frame and the outer pillar when the cab is displaced in the rising direction by the specific amount or more.

2. An upper slewing body for use in a construction machine according to claim 1, wherein the reinforcing member includes a horizontal wall formed with a penetrating-member passage hole allowing the penetrating member to penetrate therethrough, and the displacement restrainer further includes a washer placed around the penetrating member, the horizontal wall having an upper surface serving as the load transmitting surface of the reinforcing member, the washer having a lower surface serving as the load transmitting surface of the displacement restrainer.

3. An upper slewing body for use in a construction machine according to claim 2, further comprising a sealing member made of an elastic material and being disposed between the respective load transmitting surfaces of the reinforcing member and the displacement restrainer, the sealing member configured to seal a space defined around the penetrating member penetrating the reinforcing member and the bottom frame when deformation of the antivibration mount is equal to or less than a permissible deformation amount, and configured to transmit a load between the load transmitting surfaces when deformation of the antivibration mount exceeds the permissible deformation amount.

4. An upper slewing body for use in a construction machine according to claim 2, wherein the reinforcing member is in the form of a box including a front wall, a rear wall, a left wall, a right wall, a top wall and a bottom wall to define an internal space, the top wall having an upper surface serving as the load transmitting surface of the reinforcing member, the reinforcing member being attached to the outer pillar while an outer surface of one of the front wall, the rear wall, the left wall and the right wall makes surface contact with a side surface of the outer pillar.

5. An upper stewing body for use in a construction machine according to claim 4, wherein the outer surface of the reinforcing member making surface contact with the outer pillar has a greater dimension in plan view than a dimension in plan view of the side surface of the outer pillar making surface contact with the outer surface.

6. An upper slewing body for use in a construction machine according to claim 1, wherein the outer pillar attached with the reinforcing member is a pillar disposed at a rear portion of the cab.

7. An upper stewing body for use in a construction machine according to claim 1, wherein the reinforcing member is attached to the outer pillar, while disposed inside the cab.

* * * * *